(12) United States Patent
Huang et al.

(10) Patent No.: US 11,788,636 B2
(45) Date of Patent: Oct. 17, 2023

(54) JOINT ASSEMBLY FOR MULTI-CHAMBER INFLATABLE PRODUCT

(71) Applicant: Intex Marketing Ltd., Tortola (VG)

(72) Inventors: Zhi Xiong Huang, Fujian (CN); Huai Tian Wang, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 239 days.

(21) Appl. No.: 17/271,742

(22) PCT Filed: Aug. 30, 2019

(86) PCT No.: PCT/IB2019/057358
§ 371 (c)(1),
(2) Date: Feb. 26, 2021

(87) PCT Pub. No.: WO2020/044313
PCT Pub. Date: Mar. 5, 2020

(65) Prior Publication Data
US 2021/0317922 A1    Oct. 14, 2021

(30) Foreign Application Priority Data
Aug. 31, 2018 (CN) .......................... 201821421959.2

(51) Int. Cl.
*F16L 27/00* (2006.01)
*F16K 15/20* (2006.01)
(Continued)

(52) U.S. Cl.
CPC .............. *F16K 15/20* (2013.01); *F17C 13/04* (2013.01); *F17C 13/06* (2013.01); *F16L 27/00* (2013.01);
(Continued)

(58) Field of Classification Search
CPC .................................. F16L 27/00; F16L 37/12
See application file for complete search history.

(56) References Cited

U.S. PATENT DOCUMENTS 2,175,752 A * 10/1939 Gray ........................ F16L 27/00
285/94
2,674,064 A * 4/1954 Gassaway ............. F16K 15/202
446/224
(Continued)

FOREIGN PATENT DOCUMENTS

| CN | 2713174 Y | 7/2005 |
| CN | 103791128 A | 5/2014 |

(Continued)

OTHER PUBLICATIONS

International Preliminary Report on Patentability received for PCT Patent Application No. PCT/IB2019/057358, dated Mar. 11, 2021, 6 pages.
(Continued)

*Primary Examiner* — Zachary T Dragicevich
*Assistant Examiner* — James A Linford
(74) *Attorney, Agent, or Firm* — Faegre Drinker Biddle & Reath LLP

(57) ABSTRACT

A joint assembly (100) between multiple air chambers of an inflatable product (P). The joint assembly (100) may include a male component (102) coupled to a first air chamber and a female component (104) coupled to a second air chamber. When assembled, the multiple air chambers of the inflatable product may be in fluid communication with each other or with a multichannel air assembly configured to selectively inflate and/or deflate each chamber.

21 Claims, 6 Drawing Sheets

(51) Int. Cl.
  *F17C 13/04* (2006.01)
  *F17C 13/06* (2006.01)
  *F16L 37/08* (2006.01)
  *F16L 37/12* (2006.01)

(52) U.S. Cl.
  CPC ............... *F16L 37/08* (2013.01); *F16L 37/12* (2013.01); *F17C 2270/0772* (2013.01)

(56) References Cited

U.S. PATENT DOCUMENTS

| 2,734,308 | A | * | 2/1956 | Gassaway | F16K 15/202 |
| | | | | | 446/224 |
| 3,772,717 | A | * | 11/1973 | Yuen | A47C 27/10 |
| | | | | | 5/422 |
| 5,079,778 | A | * | 1/1992 | Sloot | A41D 27/08 |
| | | | | | 2/115 |
| 2003/0168854 | A1 | | 9/2003 | Lebreton et al. | |
| 2020/0100598 | A1 | * | 4/2020 | Huang | A47C 27/087 |

FOREIGN PATENT DOCUMENTS

| CN | 104061380 A | 9/2014 |
| CN | 205479879 U | 8/2016 |
| CN | 206320508 U | 7/2017 |
| CN | 208901078 U | 5/2019 |
| JP | 2000-342391 A | 12/2000 |

OTHER PUBLICATIONS

International Search Report and Written Opinion received for PCT Patent Application No. PCT/IB2019/057358, dated Jan. 9, 2020, 9 pages.

* cited by examiner

JOINT ASSEMBLY FOR MULTI-CHAMBER INFLATABLE PRODUCT

CROSS REFERENCE TO RELATED APPLICATION

This application is a national stage application of PCT International Application No. PCT/IB2019/057358, filed Aug. 30, 2019, which claims priority to Chinese Application Serial No. 201821421959.2, filed Aug. 31, 2018, the disclosure disclosures of which are hereby expressly incorporated by reference herein in their entirety.

FIELD OF THE DISCLOSURE

The present disclosure relates to a joint assembly for inflatable products. More specifically, the present disclosure relates to a joint assembly between multiple chambers of an inflatable product so that the multiple chambers of the inflatable product are in fluid communication with each other, or with a multichannel air assembly configured to selectively inflate and/or deflate each chamber.

BACKGROUND OF THE DISCLOSURE

Inflatable products are common in households due to the convenience of storage or transportation of such products in a deflated state coupled with the utility of such products in an inflated state. For example, large recreational products such as inflatable castles, inflatable bounce houses, inflatable pools, inflatable obstacles courses, and other inflatables are popular in households for the ease of storage during periods of time that the devices are not in use and the availability of entertainment when desired. Additionally, air mattresses are often used in households for activities such as camping or providing overnight guests with a bed.

Air mattresses and other inflatable products may be provided with more than one inflatable chamber so that each chamber may be selectively inflated to a different pressure for increased comfort. In such products, a separate air pump may need to be mounted to each individual chamber, increasing the production cost, maintenance cost, and overall weight of the products. Such an arrangement may also require each chamber to be inflated separately and then coupled together, lessening the convenience of the product.

Current joint assemblies for inflatable products suffer from various disadvantages. For example, current joint assemblies may require a large amount of pulling force, may slip, and/or may require frequent and inconvenient adjustments. Current joint assemblies may also be difficult to orient and access when fixed to the inflatable product, which may hinder assembly and disassembly and cause distortion of the inflatable product upon inflation of the individual air chambers.

SUMMARY

The present disclosure relates to a joint assembly for inflatable products. More specifically, the present disclosure relates to a joint assembly between multiple air chambers of an inflatable product. The joint assembly may include a male component coupled to a first air chamber and a female component coupled to a second air chamber. When assembled, the multiple air chambers of the inflatable product may be in fluid communication with each other or with a multichannel air assembly configured to selectively inflate and/or deflate each chamber.

According to an exemplary embodiment of the present disclosure, a joint assembly for an inflatable product is disclosed, the inflatable product defining a first air chamber and a second air chamber. The joint assembly includes a male component, the male component including a cap with a first protrusion and at least one first locking feature extending from the cap, the first protrusion and the cap defining a first conduit therethrough in fluid communication with the first air chamber; a female component, the female component including a head with a second protrusion extending from the head, the second protrusion and the head defining a second conduit therethrough in fluid communication with the second air chamber, wherein at least a portion of the second conduit is sized and shaped to receive the first protrusion of the male component, and wherein the head includes an annular recess defined by an outer wall and an inner wall; a locking ring, the locking ring including a locking base sized to rotate in the annular recess of the female component, the locking ring further including at least one second locking feature configured to interact with the at least one first locking feature of the male component based on rotation of the locking ring; and a gasket coupled to the female component to capture the locking ring in the annular recess.

In certain embodiments, the at least one first locking feature of the male component includes a lip that extends radially outward, and the at least one second locking feature of the locking ring includes a lip that extends radially inward toward the lip of the male component.

In certain embodiments, the locking ring further includes a grip portion extending radially outward beyond the male and female components.

In certain embodiments, the male component includes at least two first locking features and the locking ring includes at least two second locking features.

In certain embodiments, the gasket is T-shaped in cross section, the gasket including a first portion that extends into the annular recess between the locking ring and the inner wall of the female component; a second portion that extends radially inward to couple with the inner wall of the female component; and a third portion that extends radially outward to overlay the locking ring.

In certain embodiments, the joint assembly includes a locked configuration, in which the at least one second locking feature of the locking ring engages the at least one first locking feature of the male component.

In certain embodiments, the joint assembly includes an unlocked configuration, in which the at least one second locking feature of the locking ring and the at least one first locking feature of the male component are in a staggered configuration.

In certain embodiments, the gasket further includes a limiting projection extending from the gasket body to limit rotation of the locking ring relative to the male component.

In certain embodiments, the male component is fixedly coupled to a first sheet of the inflatable product that defines the first air chamber; and the female component is fixedly coupled to a second sheet of the inflatable product that defines the second air chamber.

In certain embodiments, the inflatable product further includes a multichannel air assembly having a first port and a second port, the first air chamber being in fluid communication with the first port via the joint assembly, and the second air chamber being in direct fluid communication with the second port.

According to another exemplary embodiment of the present disclosure, an inflatable product assembly is disclosed, the assembly including: an inflatable product including at least a first air chamber with a first opening and at least a second air chamber with a second opening; and a joint assembly including: a male component fixedly coupled to the first opening of the first air chamber, the male component including a cap with a first protrusion and at least one first locking feature extending from the cap, the first protrusion and the cap defining a first conduit therethrough in fluid communication with the first air chamber; a female component fixedly coupled to the second opening of the second air chamber, the female component including a head with a second protrusion extending from the head, the second protrusion and the head defining a second conduit therethrough in fluid communication with the second air chamber, wherein at least a portion of the second conduit is sized and shaped to receive the first protrusion of the male component, and wherein the head includes an annular recess defined by an outer wall and an inner wall; a locking ring, the locking ring including a locking base sized to rotate in the annular recess of the female component, the locking ring further including at least one second locking feature configured to interact with the at least one first locking feature of the male component based on rotation of the locking ring; and a gasket coupled to the female component to capture the locking ring in the annular recess.

In certain embodiments, the joint assembly includes a locked configuration, in which the at least one second locking feature of the locking ring engages with the at least one first locking feature of the male component so that the first air chamber and the second air chamber are locked together.

In certain embodiments, the joint assembly includes an unlocked configuration, in which the at least one second locking feature of the locking ring and the at least one first locking feature of the male component are in a staggered configuration so that the protrusion of the male component is removable from the second conduit of the female component and the first air chamber and the second air chamber are configured to be uncoupled.

In certain embodiments, the assembly further includes a multichannel air assembly having a first port and a second port, the first air chamber being in fluid communication with the first port via the joint assembly, and the second air chamber being in direct fluid communication with the second port.

In certain embodiments, the assembly further includes a hose that extends between the first port of the multichannel air assembly and the female component of the joint assembly.

In certain embodiments, the assembly further includes an air assembly having at least one port, the second air chamber being in direct fluid communication with the at least one port and the first air chamber being in fluid communication with the second air chamber via the joint assembly.

According to yet another exemplary embodiment of the present disclosure, a method of assembling an inflatable product having a first air chamber and a second air chamber is disclosed, the method including the steps of: fixedly coupling a male component of a joint assembly to a first opening of a first air chamber, the male component including a cap with a first protrusion and a first locking feature extending from the cap, the first protrusion and the cap defining a first conduit therethrough in fluid communication with the first air chamber; fixedly coupling a female component of the joint assembly to a second opening of a second air chamber, the female component including a head with a second protrusion extending from the head, the second protrusion and the head defining a second conduit therethrough in fluid communication with the second air chamber, wherein at least a portion of the second conduit is sized and shaped to receive the first protrusion of the male component, and wherein the head includes an annular recess defined by an outer wall and an inner wall; inserting the protrusion of the male component into the second conduit of the female component so that the first conduit and the second conduit are in fluid communication with each other, while the male component and the female component form a friction-fit coupling; and rotating a locking ring through the annular recess of the female component until at least one second locking feature of the locking ring engages the at least one first locking feature of the male component.

In certain embodiments, the method further includes the step of limiting the rotation of the locking ring with a limiting protrusion of a gasket.

In certain embodiments, the rotating step includes gripping a grip portion extending radially outward from the at least one second locking feature of the locking ring.

In certain embodiments, the rotating step involves less than one turn of the locking ring, such as a 90-degree rotation of the locking ring.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
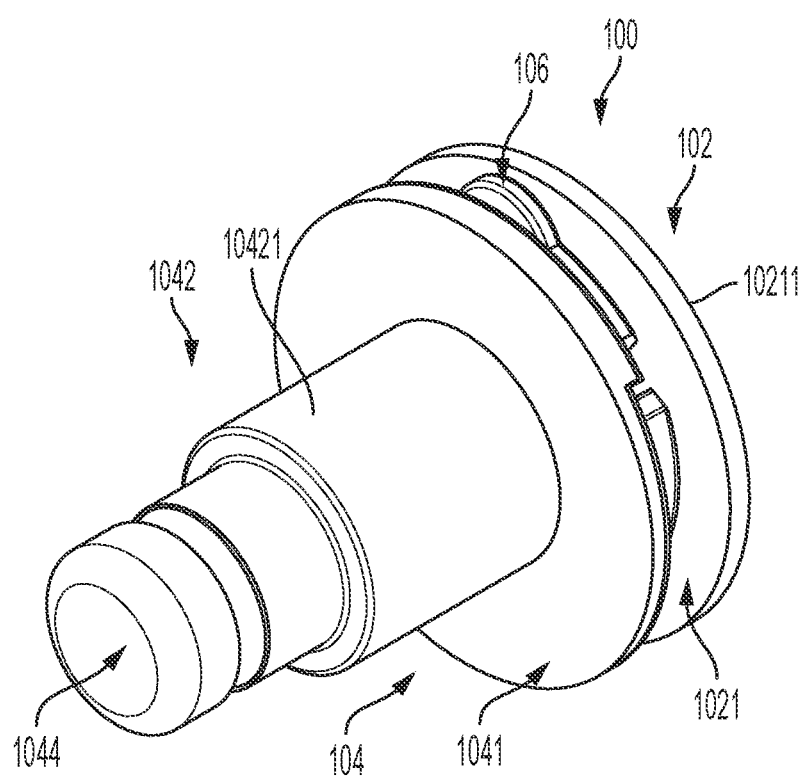
FIG. 1 illustrates a joint assembly of the present disclosure, the joint assembly including a male component with a protrusion and a conduit and a female component with a conduit configured to receive the protrusion of the male component so that the conduit of the male component and the conduit of the female component are in fluid communication.
Figure 2:
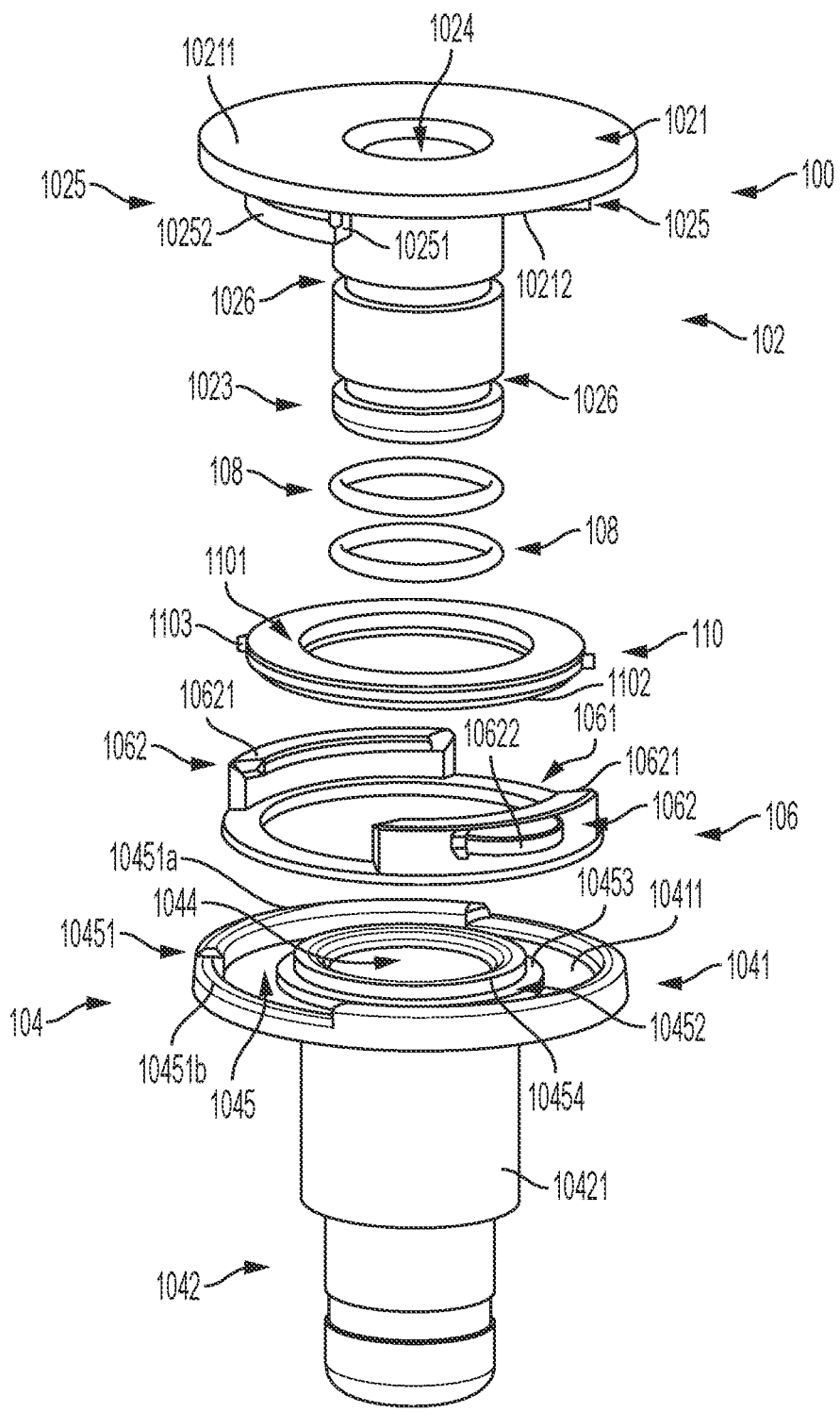
FIG. 2 is an exploded view of the joint assembly of FIG. 1, further illustrating a gasket and a locking ring of the joint assembly of the present disclosure.
Figure 5:
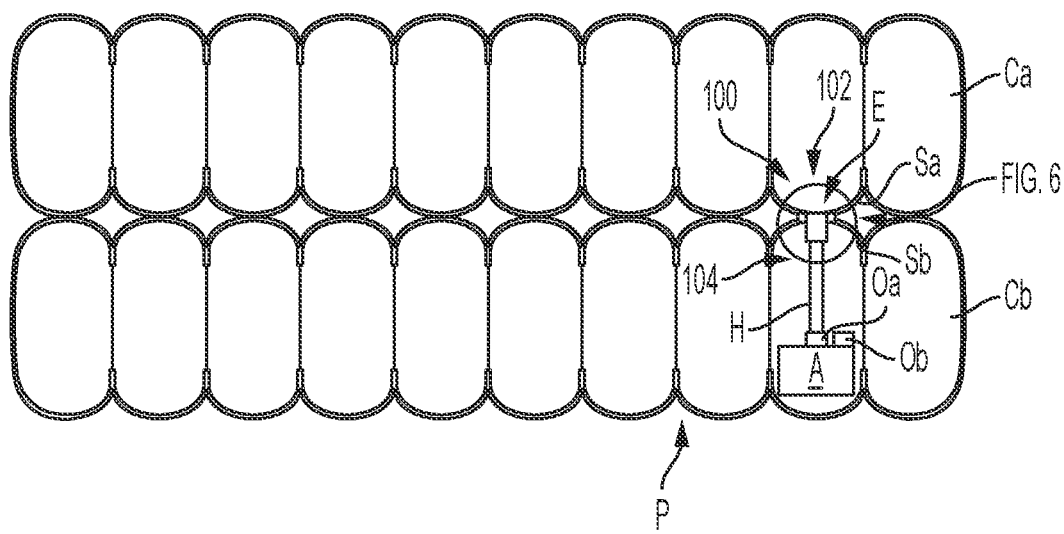
FIG. 5 illustrates a schematic view of an exemplary inflatable product having multiple air chambers, a multichannel air assembly, and the joint assembly of FIG. 1 between the air chambers.

Referring initially to FIGS. 1-2, a joint assembly 100 is disclosed for use with an inflatable product P (FIG. 5). The joint assembly 100 includes a male component 102 having a cap 1021 with a flat top surface 10211 and a protrusion 1023 (FIG. 2) extending away from the cap 1021. In the illustrative embodiment shown, the cap 1021 forms a circle. In other embodiments, the cap 1021 may form other shapes. The protrusion 1023 (FIG. 2) may generally be centered underneath the cap 1021. The male component 102 further includes a conduit 1024 (FIG. 2) extending through the length of the protrusion 1023 (FIG. 2) and the cap 1021 so that air can move through the conduit 1024 (FIG. 2) from the cap 1021 to the opposite end of the protrusion 1023 and vice versa (FIG. 2).

Still referring to FIGS. 1-2, the joint assembly 100 further includes a female component 104, having a head 1041 and a receiving protrusion 1042 extending away from the head 1041. In the illustrative embodiment shown, the head 1041 forms a circle. In other embodiments, the head 1041 may form other shapes. The receiving protrusion 1042 may generally be centered underneath the head 1041. The female component 104 further includes a conduit 1044 extending through the length of the receiving protrusion 1042 and the head 1041 so that air can move through the conduit 1044 from the head 1041 to the opposite end of the receiving protrusion 1042 and vice versa. At least a portion of the conduit 1044 of the female component 104 is sized to receive at least a portion of the protrusion 1023 of the male component 102 (see FIG. 3). For example, the protrusion 1042 of the female component 104 may have an enlarged portion 10421 corresponding with an enlarged portion of the conduit 1044, which is shaped and sized to receive the protrusion 1023 of the male component 102. In other embodiments, the entire conduit 1044 of the female component 104 may be shaped and sized to receive the protrusion 1023 of the male component 1042. As discussed further herein, when the female component 104 has received the protrusion 1023 of the male component 102 to form the joint assembly 100, a friction-fit coupling is accomplished between the male component 102 and the female component 104, and a locking ring 106 may be utilized to facilitate the locking of the male component 102 to the female component 104 to prevent the undesired uncoupling of the joint assembly 100.

Now referring to FIG. 2, an exploded view of the joint assembly 100 is shown. As shown, an outer ring 10451 forms a wall around the outer edge of an upper surface 10411 of the head 1041 of the female component 104, while an inner ring 10452 forms a wall around the outer edge of the conduit 1044. Taller portions 10451a of the outer ring 10451 may extend further from the upper surface 10411 of the female component 104 relative to shorter portions 10451b of the outer ring 10451. The outer ring 10451 and the inner ring 10452 cooperate to form an annular recess 1045 along the upper surface 10411 of the head 1041 of the female component 104. The inner ring 10452 further includes an annular stepped lug boss 10454 extending from a shoulder 10453 of the inner ring 10452.

The male component 102 further includes at least one locking feature, illustratively a ridge 1025 extending from a bottom surface 10212 of the cap 1021. The ridge 1025 is comprised of a ridge wall 10251 and a lip 10252, the lip 10252 extending from the bottom of the ridge wall 10251 so that the ridge 1025 forms an "L" shape in a direction away from the protrusion 1023. The ridge 1025 extends at least a portion around the bottom surface 10212 of the cap 1021. In some embodiments, the male component 102 further includes a second ridge 1025 opposite the first ridge 1025. In yet other embodiments, more ridges may be included. The male component 102 may also include a seal recess 1026 configured to receive a seal 108. The seal 108 may be comprised of a flexible polymer, such as a rubber O-ring, to facilitate an air tight connection between the protrusion 1023 of the male component 102 and the conduit 1044 of the female component 104. In some embodiments, the male component 102 may include two spaced-apart seal recesses 1026 along its length, as shown in FIG. 2, each seal recess 1026 corresponding to a seal 108. In yet other embodiments, the male component 102 may include further seal recesses 1026 corresponding with further seals 108.

As mentioned above, the joint assembly 100 further includes a locking ring 106. In the illustrative embodiment shown, the locking ring 106 forms a circle. In other embodiments, the locking ring 106 may form other shapes. A locking base 1061 forms the bottom of the locking ring 106 and is shaped and sized to be rotatably received in the annular recess 1045 of the female component 104. The locking ring 106 includes at least one locking feature, illustratively a locking ridge 1062 extending from an outer edge of the locking base 1061 to form a partial wall around the outer edge of the locking base 1061. The locking ridge 1062 includes an inner lip 10621 extending inwardly from the upper edge of the locking ridge 1062. As shown, the inner lip 10621 may extend the entire length of the locking ridge 1062. In other embodiments, the inner lip 10621 may extend from only a portion of the length of the locking ridge 1062. The locking ridge 1062 further includes an outer handle or grip portion 10622 extending outwardly from the outer surface of the locking ridge 1062. In the illustrative embodiment shown in FIG. 2, the locking ring 106 of the joint assembly 100 includes two locking ridges 1062, each with an inner lip 10621 and a grip portion 10622. Each grip portion 10622 may extend radially outward beyond the male component 102 and/or the female component 104 for access by the user. As discussed below, each inner lip 10621 of the locking ring 106 is configured to mate with each ridge 1025 of the male component 102.

Still referring to FIG. 2, the joint assembly 100 further includes a gasket 110. In the illustrative embodiment shown, the gasket 110 forms a circle. In other embodiments, the gasket 110 may form other shapes. The illustrative gasket 110 is T-shaped in cross-section and comprises a substantially horizontal upper gasket body 1101 and a bottom annular lug boss 1102 extending vertically downward from the bottom of the upper gasket body 1101. The gasket 110 may be made of rubber or another suitable material configured to grip the female component 104 and facilitate an air tight connection between the male component 102 and the female component 104.

Figure 3:
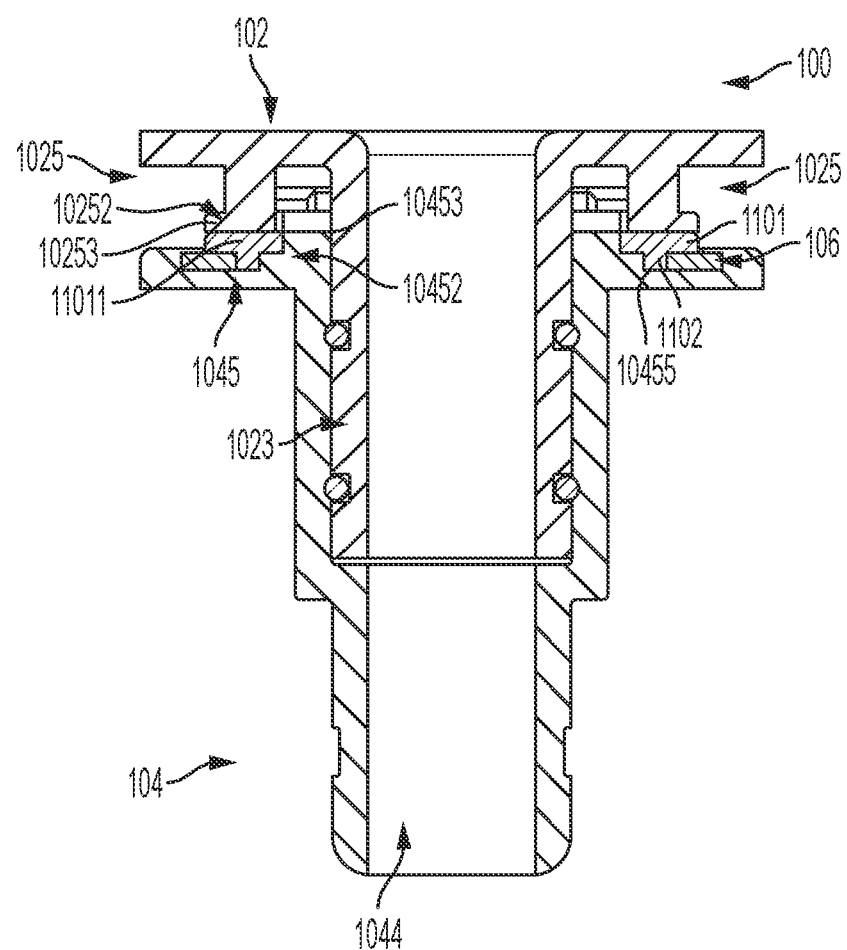
FIG. 3 is a cross-sectional view of the assembled joint assembly of FIG. 1, illustrating an unlocked configuration of the joint assembly.
Figure 4:
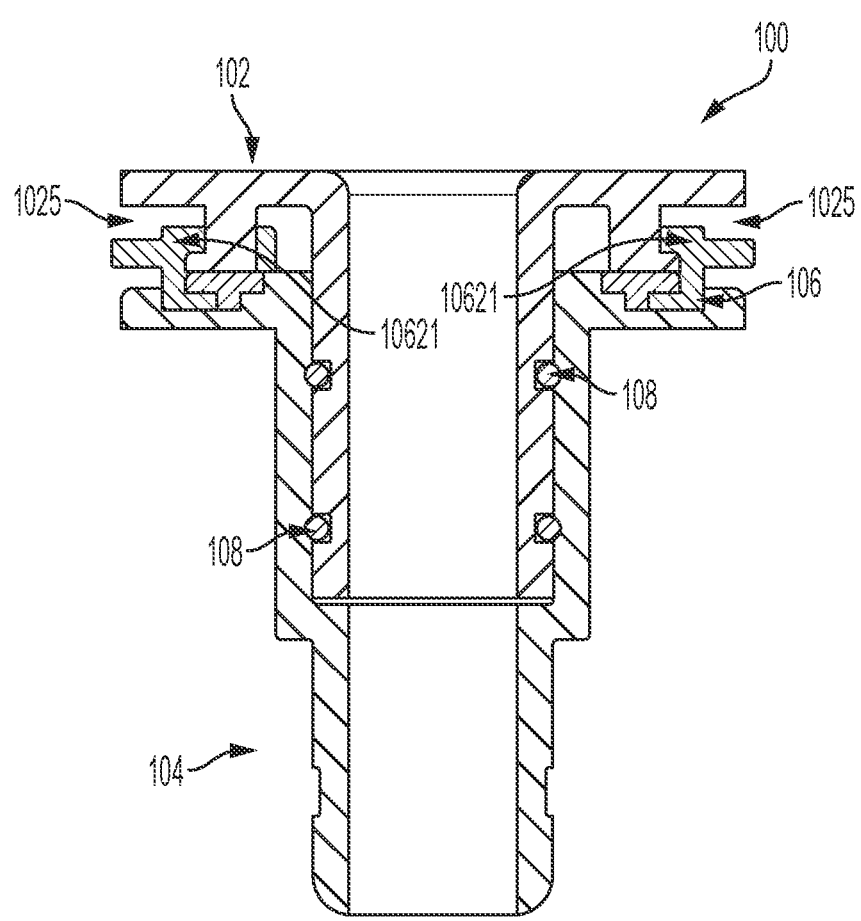
FIG. 4 is a cross-sectional view of the assembled joint assembly of FIG. 1, illustrating a locked configuration of the joint assembly.

When assembled as shown in FIG. 3, the locking ring 106 is first placed in the annular recess 1045 of the female component 104 so that the grip portions 10622 of the locking ring 106 are received above the outer ring 10451 of the female component 104 (FIGS. 2 and 4). The locking ring 106 abuts the outer ring 10451 of the female component 104 such that a gap 10455 (FIG. 3) is left between the locking ring 106 and the inner ring 10452 within the annular recess 1045 when assembled. Further, the shoulder 10453 and the upwardly extending lug boss 10454 of the inner ring 10452 of the female component 104 are left exposed.

Next, the gasket 110 is coupled to the female component 104 to capture the rotating locking ring 106 in the annular recess 1045. The bottom annular lug boss 1102 of the gasket 110 corresponds with and fits within the gap 10455 (FIG. 3) and tightly against the inner ring 10452. A first portion of the upper gasket body 1101 extends inwardly and rests tightly against the shoulder 10453 and the lug boss 10454 of the inner ring 10452. This tight coupling between the gasket 110 and the inner ring 10452 may be achieved via friction fit, over-molding, adhesive, welding, or another suitable connection. A second portion of the gasket body 1101 extends outwardly and rests loosely on the locking base 1061 (FIG. 2) of the locking ring 106, thereby capturing the locking ring 106 beneath the gasket body 1101 while still allowing the locking ring 106 to rotate within the annular recess 1045 of the female component 104. The gasket 110 further includes at least one limiting projection 1103 located at a radial position of the gasket body 1101, which is disposed between the locking ridges 1062 of the locking ring 106 when the joint assembly 100 is assembled. The limiting projection 1103 is configured to limit the rotation of the locking ring 106 within the annular recess 1045 in either direction by coming into contact with the locking ridge 1062 of the locking ring 106.

Referring still to FIG. 3, the joint assembly 100 is shown assembled and in an "unlocked" configuration. For example, in the "unlocked" configuration, the male component 102 and the female component 104 may be separated by a user as described below. As mentioned above, when assembled, the locking ring 106 is captured within the annular recess 1045 of the female component 104 beneath the gasket 110. A bottom surface 10253 of the lip 10252 of the ridge 1025 of the male component 102 rests on a top surface 11011 of the gasket body 1101. As shown, the ridges 1025 of the male component 102 and the inner lips 10621 (FIG. 2) of the locking ring 106 are staggered or offset from one another so that the male component 102 and the female component 104 may be freely separated, for example, by pulling the components 102, 104 apart and removing the protrusion 1023 of the male component 102 from the conduit 1044 of the female component 104.

Comparing now to FIG. 4, the joint assembly 100 is shown assembled and in a "locked" configuration. For example, in the "locked" configuration, the male component 102 and the female component 104 may not be separated, and an airtight coupling is realized between the male component 102 and the female component 104, which may be facilitated by seals 108. The joint assembly 100 is assembled as described above in relation to FIG. 3; however, in FIG. 4, the locking ring 106 has been rotated by less than one full turn, more specifically about 90 degrees, using the handles 1062 so that the locking features, specifically the ridges 1025 of the male component 102 and the inner lips 10621 of the locking ring 106, are engaged. More specifically, the inner lips 10621 of the locking ring 106 wrap over the ridges 1025 of the male component 102 so that the male component 102 cannot be removed from the female component 104. In other words, in a "locked" configuration, the locking ring 106 is engaged with the male component 102. In an "unlocked" configuration, the locking ring 106 is not engaged with the male component 102.

Although the joint assembly 100 is shown and described with locking features being disposed on the male component 102 to engage the locking ring 106 captured in the female component 104, it is also within the scope of the present disclosure to reverse this arrangement. In other words, the locking features could be disposed on the female component 104 to engage the locking ring 106 captured in the male component 102.

Figure 6:
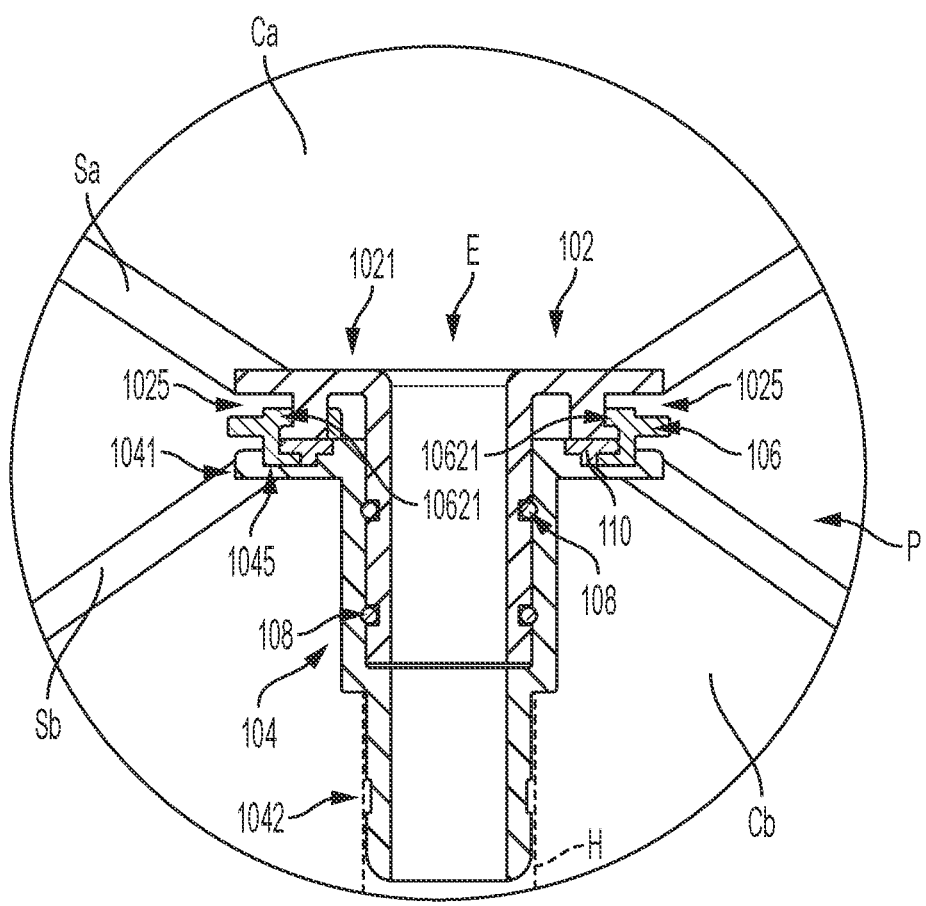
FIG. 6 is a detailed view of the inflatable product of FIG. 5, illustrating the locked configuration of the joint assembly as coupled to the inflatable product.

Referring next to FIGS. 5 and 6, an inflatable product P is shown having at least an upper air chamber Ca and a lower air chamber Cb connected with the joint assembly 100. For example, the bottom sheet Sa of the upper air chamber Ca and the top sheet Sb of the lower air chamber Cb are respectively provided with aligned openings E. The cap 1021 of the male component 102 is fixedly coupled (e.g., adhered, welded) to the bottom sheet Sa of the upper air chamber Ca at the opening E, while the ridges 1025 (FIG. 6) of the male component 102 are accessible outside of the upper air chamber Ca and the protrusion 1023 of the male component 102 extends into the lower air chamber Cb. The head 1041 of the female component 104 is fixedly coupled (e.g., adhered, welded) to the top sheet Sb of the lower air chamber Cb at the opening E, while the annular recess 1045 (FIG. 6), the gasket 110 (FIG. 6), and the locking ring 106 (FIG. 6) are accessible outside of the lower air chamber Cb and the receiving protrusion 1042 (FIG. 6) remains positioned within the lower air chamber Cb. Referring further to FIG. 6, once the sheets Sa, Sb are positioned and aligned, the male component 102 and the female component 104 may be assembled together in the "unlocked" configuration (FIG. 3) and then coupled in the "locked" configuration by conveniently accessing and rotating the locking ring 106 less than one full turn between the sheets Sa, Sb. As shown, the upper air chamber Ca and the lower air chamber Cb are in fluid communication at the opening E with the joint assembly 100 in the "locked" configuration.

The inflatable product P further includes a multichannel air assembly A, which communicates with the air chambers Ca-Cb through the corresponding ports Oa-Ob and one or more optional hoses H. The multichannel air assembly A may be the multichannel air assembly A as disclosed in PCT Publication No. WO2019/097453 filed on Nov. 15, 2018, the disclosure of which is hereby expressly incorporated by reference. Although the multichannel air assembly A is coupled to two air chambers Ca-Cb in FIGS. 5 and 6, in other embodiments, an inflatable product P may have more than two air chambers C. Other air assembly A and air chamber C arrangements are disclosed in the above-incorporated WO2019/097453 publication.

The joint assembly 100 disclosed herein may be used to couple the hose H with an air chamber C of the inflatable product P (in this case the upper air chamber Ca of the inflatable product P) so that the air chamber C is in fluid communication with the corresponding port O of the air assembly A (in this case port Oa of the air assembly A). The hose H may be sized to fit around the exposed protrusion 1042 of the female component 104, as shown in FIG. 6.

To inflate the upper air chamber Ca, the air assembly A may pump ambient air from the port Oa, through the hose H, through the joint assembly 100, and into the upper air chamber Ca. To deflate the upper air chamber Ca, the air assembly A may draw air from the upper air chamber Ca, through the joint assembly 100, through the hose H, through the port Oa, and into the surrounding atmosphere.

To inflate the lower air chamber Cb, the air assembly A may pump ambient air from the port Ob directly into the lower air chamber Cb. To deflate the lower air chamber Cb, the air assembly A may draw air from the lower air chamber Cb, through the port Ob, and into the surrounding atmosphere.

In other embodiments, the joint assembly 100 may be used to couple the upper air chamber Ca with the lower air chamber Cb so that the air chambers Ca, Cb are in fluid communication with the other. To inflate the connected air chambers Ca-Cb, the air assembly A may pump ambient air from a single port, into the lower air chamber Cb, through the joint assembly 100, and into the upper air chamber Ca. This process may be reversed to deflate the connected air chambers Ca-Cb.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A joint assembly for an inflatable product, the inflatable product defining a first air chamber and a second air chamber, the joint assembly comprising:
a male component, the male component comprising a cap with a first protrusion and at least one first locking feature extending from the cap, the first protrusion and the cap defining a first conduit therethrough in fluid communication with the first air chamber;
a female component, the female component comprising a head with a second protrusion extending from the head, the second protrusion and the head defining a second conduit therethrough in fluid communication with the second air chamber, wherein at least a portion of the second conduit is sized and shaped to receive the first protrusion of the male component, and wherein the head includes an annular recess defined by an outer wall and an inner wall;
a locking ring, the locking ring comprising a locking base sized to rotate in the annular recess of the female component, the locking ring further comprising at least one second locking feature configured to interact with the at least one first locking feature of the male component based on rotation of the locking ring; and
a gasket coupled to the female component to capture the locking ring in the annular recess.

2. The joint assembly of claim 1, wherein:
the at least one first locking feature of the male component comprises a lip that extends radially outward; and
the at least one second locking feature of the locking ring comprises a lip that extends radially inward toward the lip of the male component.

3. The joint assembly of claim 1, the locking ring further comprising a grip portion extending radially outward beyond the male and female components.

4. The joint assembly of claim 1, wherein the male component comprises at least two first locking features and the locking ring comprises at least two second locking features.

5. The joint assembly of claim 1, wherein the gasket is T-shaped in cross section, the gasket comprising:
a first portion that extends into the annular recess between the locking ring and the inner wall of the female component;
a second portion that extends radially inward to couple with the inner wall of the female component; and
a third portion that extends radially outward to overlay the locking ring.

6. The joint assembly of claim 1, wherein the joint assembly includes a locked configuration, in which the at least one second locking feature of the locking ring engages the at least one first locking feature of the male component.

7. The joint assembly of claim 1, wherein the joint assembly includes an unlocked configuration, in which the at least one second locking feature of the locking ring and the at least one first locking feature of the male component are in a staggered configuration.

8. The joint assembly of claim 1, wherein the gasket further comprises a gasket body and a limiting projection extending from the gasket body to limit rotation of the locking ring relative to the male component.

9. The joint assembly of claim 1, wherein:
the male component is fixedly coupled to a first sheet of the inflatable product that defines the first air chamber; and
the female component is fixedly coupled to a second sheet of the inflatable product that defines the second air chamber.

10. The joint assembly of claim 1, wherein the inflatable product further comprises a multichannel air assembly having a first port and a second port, the first air chamber being in fluid communication with the first port via the joint assembly, and the second air chamber being in direct fluid communication with the second port.

11. An inflatable product assembly, the assembly comprising:
an inflatable product comprising at least a first air chamber with a first opening and at least a second air chamber with a second opening; and
a joint assembly comprising:
a male component fixedly coupled to the first opening of the first air chamber, the male component comprising a cap with a first protrusion and at least one first locking feature extending from the cap, the first protrusion and the cap defining a first conduit therethrough in fluid communication with the first air chamber;
a female component fixedly coupled to the second opening of the second air chamber, the female component comprising a head with a second protrusion extending from the head, the second protrusion and the head defining a second conduit therethrough in fluid communication with the second air chamber, wherein at least a portion of the second conduit is sized and shaped to receive the first protrusion of the male component, and wherein the head includes an annular recess defined by an outer wall and an inner wall;
a locking ring, the locking ring comprising a locking base sized to rotate in the annular recess of the female component, the locking ring further comprising at least one second locking feature configured to interact with the at least one first locking feature of the male component based on rotation of the locking ring; and
a gasket coupled to the female component to capture the locking ring in the annular recess.

12. The inflatable product assembly of claim 11, wherein the joint assembly includes a locked configuration, in which the at least one second locking feature of the locking ring engages with the at least one first locking feature of the male component so that the first air chamber and the second air chamber are locked together.

13. The joint assembly of claim 11, wherein the joint assembly includes an unlocked configuration, in which the at least one second locking feature of the locking ring and the at least one first locking feature of the male component are in a staggered configuration so that the first protrusion of the male component is removable from the second conduit of the female component and the first air chamber and the second air chamber are configured to be uncoupled.

14. The joint assembly of claim 11, further comprising a multichannel air assembly having a first port and a second port, the first air chamber being in fluid communication with the first port via the joint assembly, and the second air chamber being in direct fluid communication with the second port.

15. The joint assembly of claim 14, further comprising a hose that extends between the first port of the multichannel air assembly and the female component of the joint assembly.

16. The joint assembly of claim 11, further comprising an air assembly having at least one port, the second air chamber being in direct fluid communication with the at least one port and the first air chamber being in fluid communication with the second air chamber via the joint assembly.

17. A method of assembling an inflatable product having a first air chamber and a second air chamber, the method comprising the steps of:
fixedly coupling a male component of a joint assembly to a first opening of a first air chamber, the male component comprising a cap with a first protrusion and a first locking feature extending from the cap, the first protrusion and the cap defining a first conduit therethrough in fluid communication with the first air chamber;
fixedly coupling a female component of the joint assembly to a second opening of a second air chamber, the female component comprising a head with a second protrusion extending from the head, the second protrusion and the head defining a second conduit therethrough in fluid communication with the second air chamber, wherein at least a portion of the second conduit is sized and shaped to receive the first protrusion of the male component, and wherein the head includes an annular recess defined by an outer wall and an inner wall;
inserting the first protrusion of the male component into the second conduit of the female component so that the first conduit and the second conduit are in fluid communication with each other, while the male component and the female component form a friction-fit coupling; and
rotating a locking ring through the annular recess of the female component until at least one second locking feature of the locking ring engages the at least one first locking feature of the male component.

18. The method of claim 17, further comprising the step of limiting the rotation of the locking ring with a limiting protrusion of a gasket.

19. The method of claim 17, wherein the rotating step comprises gripping a grip portion extending radially outward from the at least one second locking feature of the locking ring.

20. The method of claim 17, wherein the rotating step involves less than one turn of the locking ring.

21. The method of claim 20, wherein the rotating step involves a 90-degree rotation of the locking ring.

* * * * *